United States Patent
Wang et al.

(10) Patent No.: US 7,997,911 B2
(45) Date of Patent: Aug. 16, 2011

(54) PORTABLE ELECTRONIC DEVICE

(75) Inventors: Chih-Kuang Wang, Taoyuan County (TW); Ching-Liang Chiang, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 0 days.

(21) Appl. No.: 12/631,867

(22) Filed: Dec. 7, 2009

(65) Prior Publication Data
US 2010/0255695 A1 Oct. 7, 2010

(30) Foreign Application Priority Data

Apr. 6, 2009 (TW) .............................. 98111362 A

(51) Int. Cl.
*H01R 13/44* (2006.01)
(52) U.S. Cl. .................................. 439/131; 361/679.43
(58) Field of Classification Search .................. 439/131, 439/171, 172, 310; 361/679.01, 679.02, 361/679.09, 679.26, 679.39, 679.43, 679.55, 361/679.58
See application file for complete search history.

(56) References Cited

U.S. PATENT DOCUMENTS

| 5,751,546 | A | 5/1998 | Clark et al. | |
|---|---|---|---|---|
| 6,561,824 | B1 * | 5/2003 | Beckham et al. | 439/131 |
| 6,568,946 | B1 * | 5/2003 | Chou | 439/131 |
| 7,009,847 | B1 * | 3/2006 | Wu et al. | 361/737 |
| 7,641,483 | B2 * | 1/2010 | Wei et al. | 439/131 |
| 7,871,277 | B2 * | 1/2011 | Hou et al. | 439/131 |

FOREIGN PATENT DOCUMENTS

| EP | 1265127 | 12/2002 |
|---|---|---|
| GB | 2281480 | 3/1995 |
| GB | 2457252 | 8/2009 |

OTHER PUBLICATIONS

"Search Report of European Counterpart Application" issued on Apr. 9, 2010, p. 1-p. 7.

* cited by examiner

*Primary Examiner* — Thanh-Tam T Le
(74) *Attorney, Agent, or Firm* — Jianq Chyun IP Office

(57) ABSTRACT

A portable electronic device includes a first body, a second body, a motion assembly, a connector, and an ejector. The second body has a hollow portion, and the first body is movable disposed on the second body to cover the hollow portion. The motion assembly is disposed between the first body and the second body, so that the first body is able to move relatively to the second body. The connector is movably disposed in the hollow portion. The ejector is disposed between the connector and the second body. When the first body moves relatively to the second body to expose the hollow portion of the second body, the ejector is capable of driving the connector to move out of the hollow portion.

9 Claims, 11 Drawing Sheets

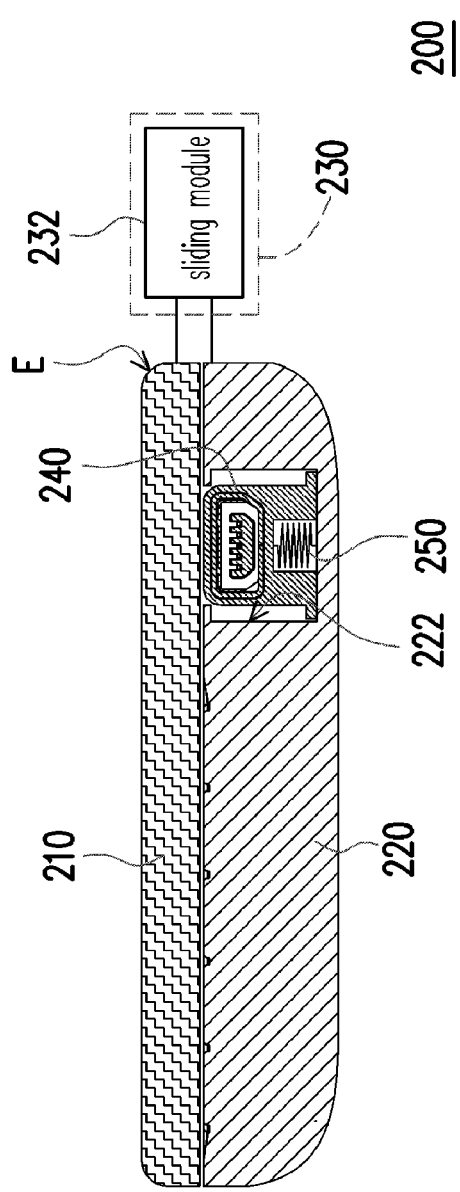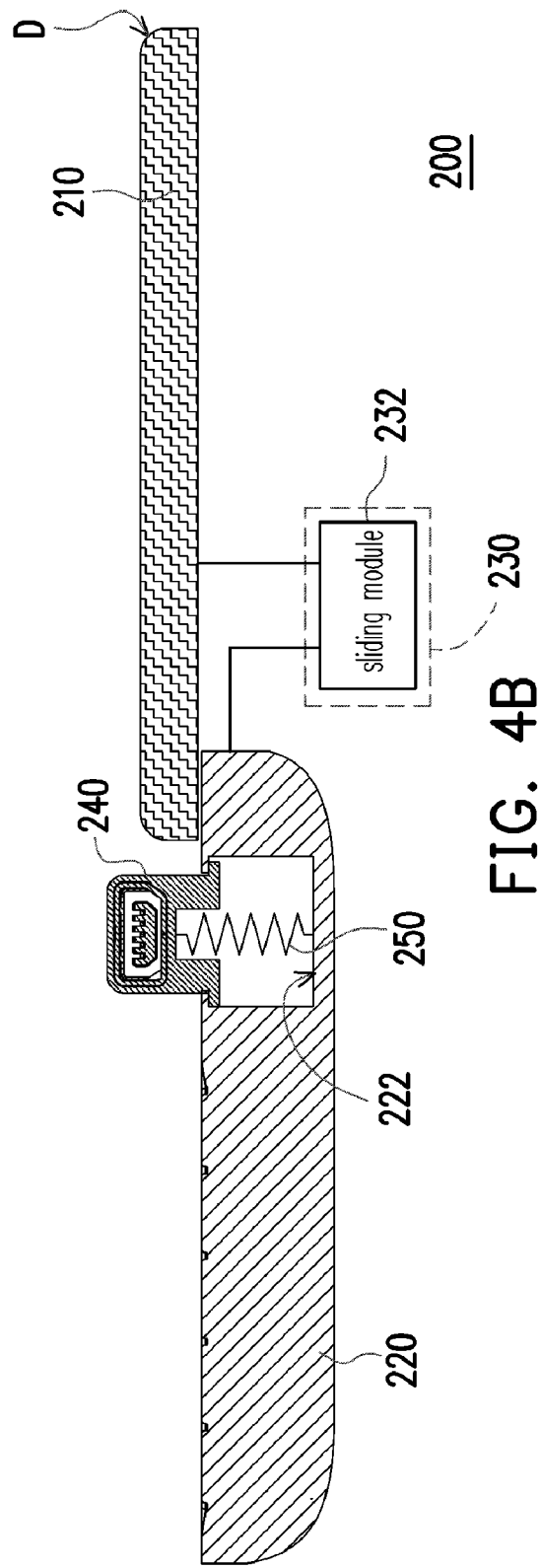
FIG. 4A
FIG. 4B

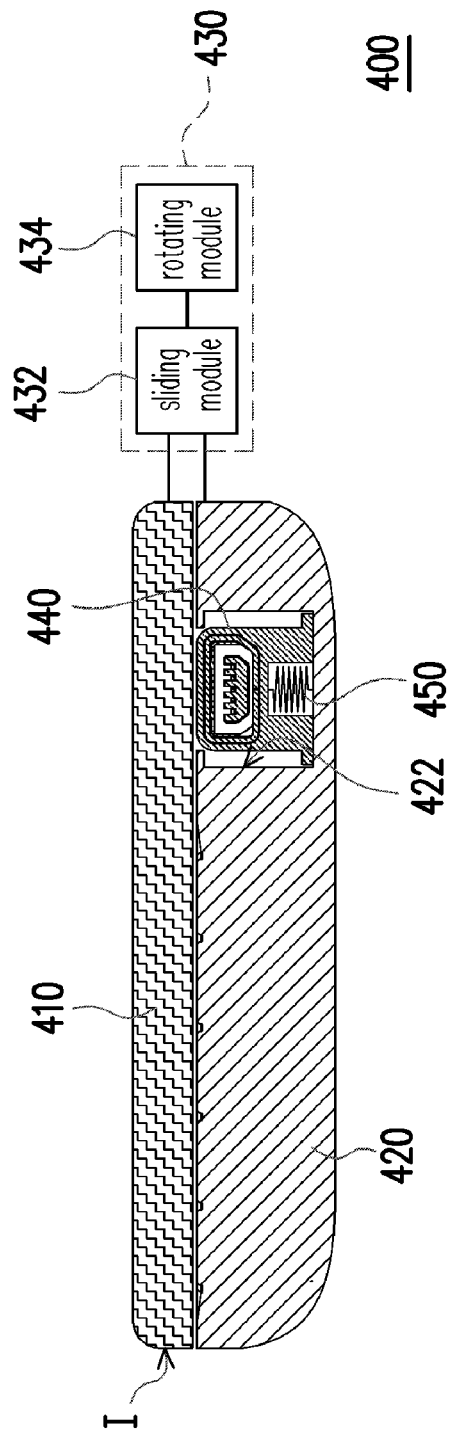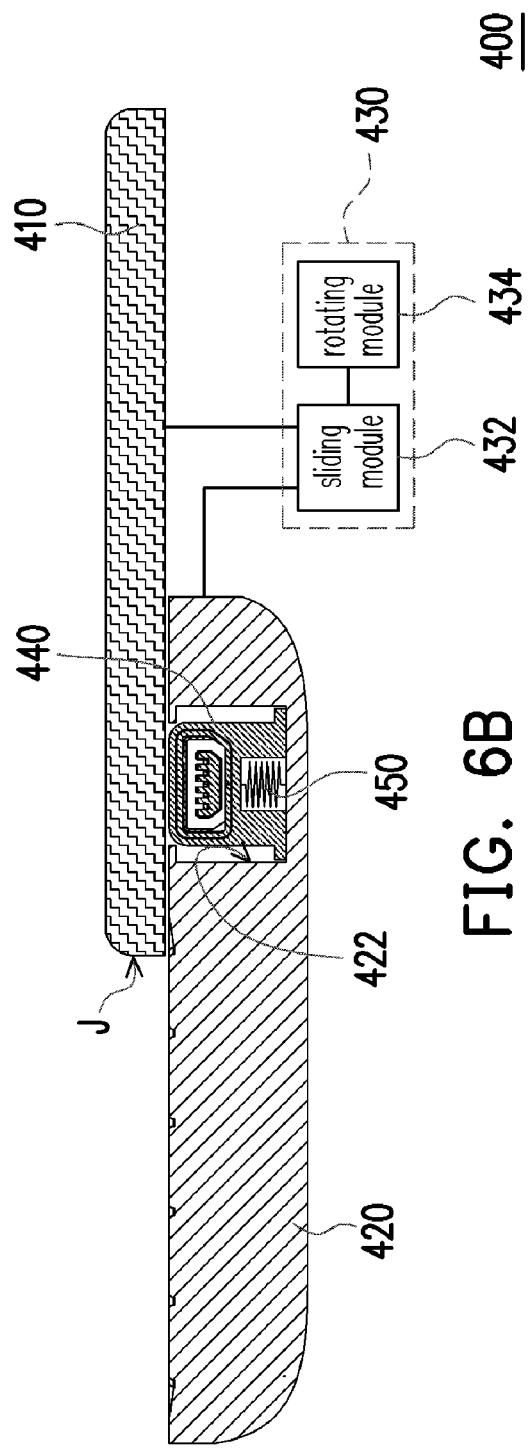
FIG. 6A
FIG. 6B

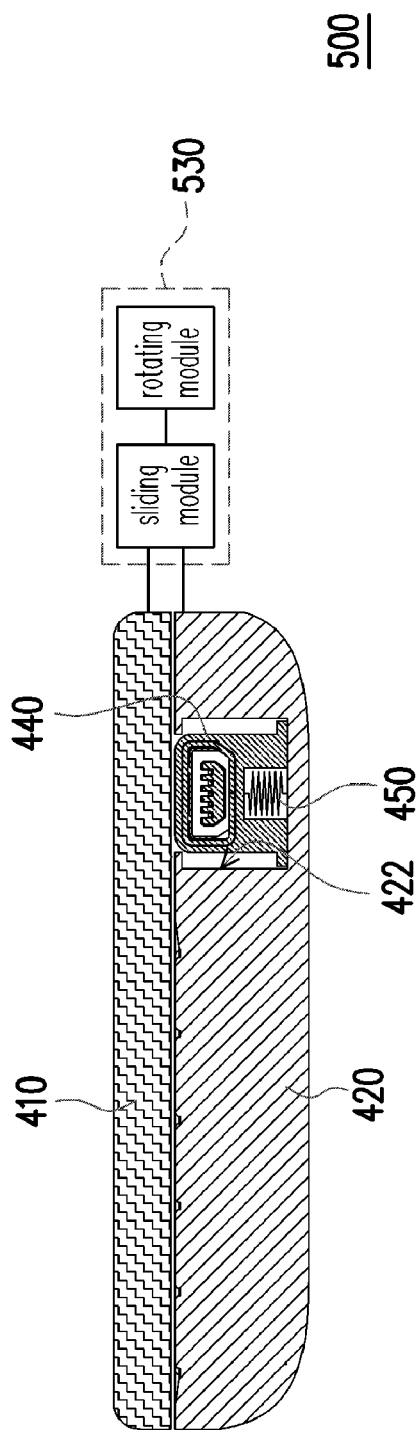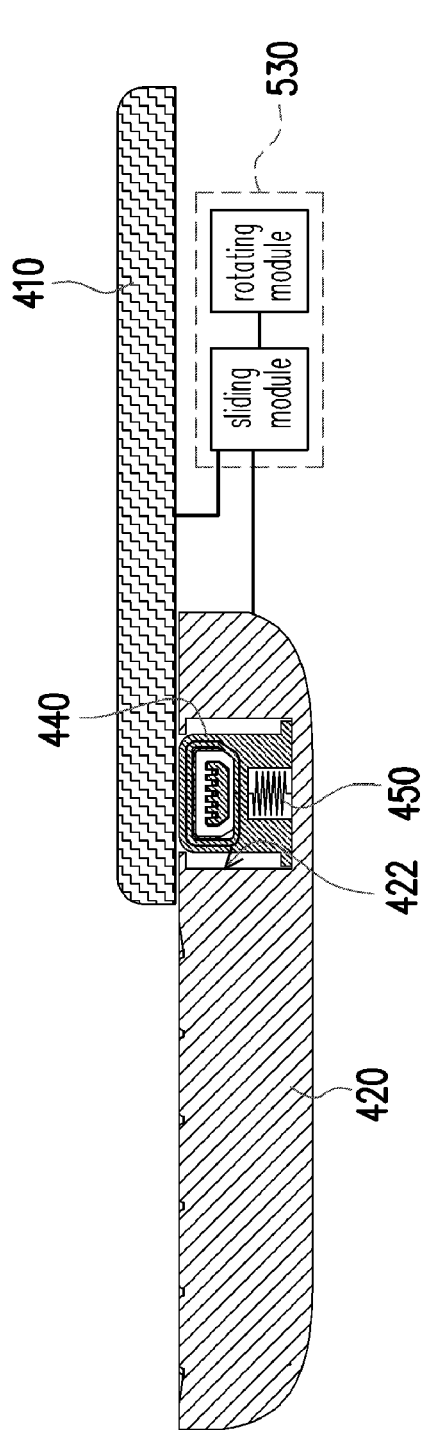
FIG. 7A
FIG. 7B

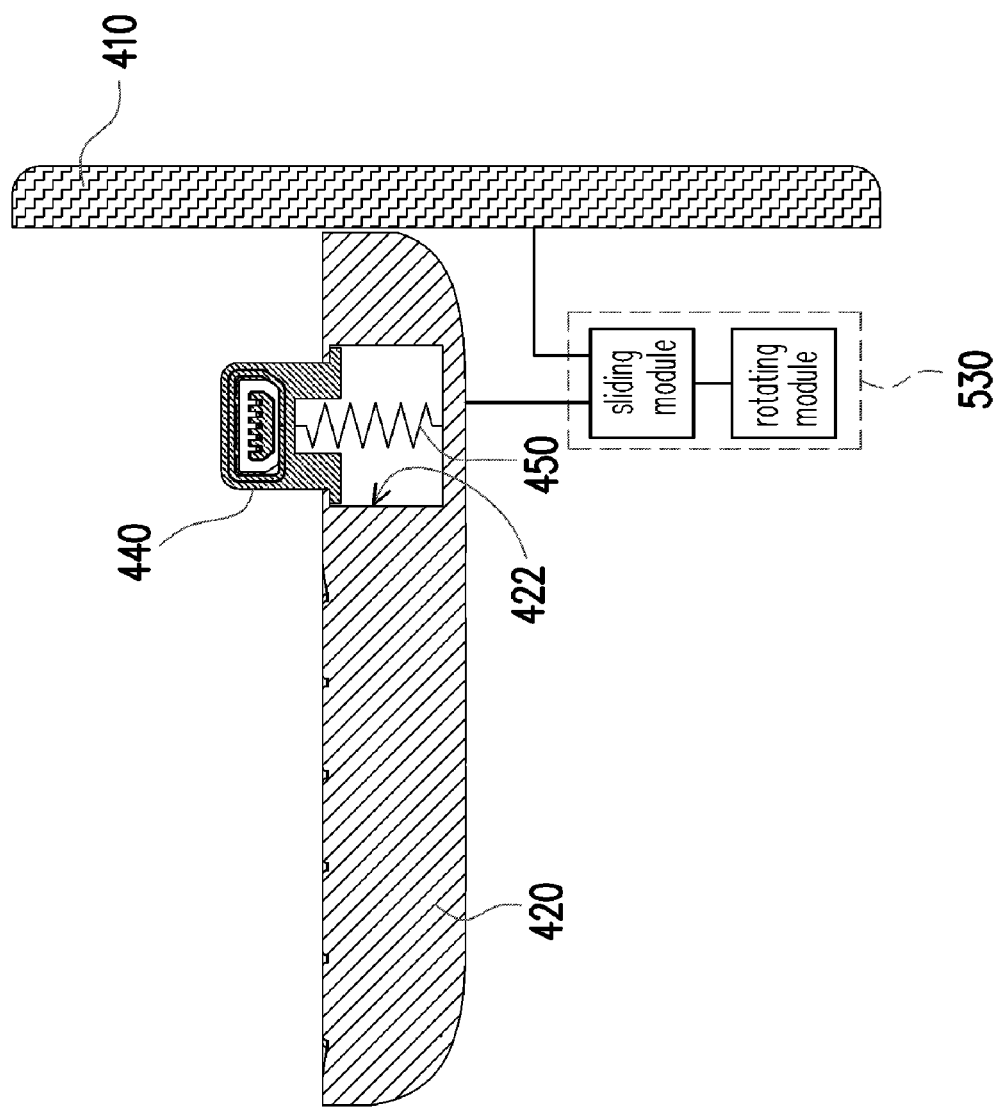

PORTABLE ELECTRONIC DEVICE

CROSS-REFERENCE TO RELATED APPLICATION

This application claims the priority benefit of Taiwan application serial No. 98111362, filed on Apr. 6, 2009. The entirety of the above-mentioned patent application is hereby incorporated by reference herein and made a part of this specification.

BACKGROUND OF THE INVENTION

1. Field of the Invention

The present application relates to a portable electronic device. More particularly, the present application relates to a portable electronic device having a hidden connector.

2. Description of Related Art

With advancement of technology, human beings tend to rely on electronic devices to a greater extent day by day. To comply with current requirement for great performance of computation and compactness, various portable electronic devices including ultra mobile personal computers (UMPCs), tablet PCs, pocket PCs, personal digital assistants (PDAs), cell phones, and notebook PCs are correspondingly developed.

Connectors in the portable electronic devices, for example, refer to universal serial buses (USBs) which are disposed outside main bodies of the portable electronic devices. Thereby, not only the exterior design of the portable electronic devices is deteriorated, but also dust or undesired objects are prone to enter into the connectors, thus giving rise to poor electrical contact.

SUMMARY OF THE INVENTION

The present application is directed to a portable electronic device with succinct appearance.

In the present application, a portable electronic device including a first body, a second body, a motion assembly, a connector, and an ejector is provided. The second body has a hollow portion, and the first body is movable disposed on the second body to cover the hollow portion. The motion assembly is disposed between the first body and the second body, such that the first body is able to move relatively to the second body. The connector is movably disposed in the hollow portion. The ejector is disposed between the connector and the second body. When the first body moves relatively to the second body, and the hollow portion of the second body is exposed, the ejector is capable of driving the connector to move out of the hollow portion.

Based on the above, in the present application, the connector of the portable electronic device is hidden in the bodies. When the connector is to be used, the two bodies can be slid or rotated open, such that the connector can be moved out of the bodies. As such, the portable electronic device is simple in appearance, and the exposed connector can be prevented from being damaged by external dust or undesired objects.

To make the above features and advantages of the present invention more comprehensible, several embodiments accompanied with drawings are described in detail as follows.

BRIEF DESCRIPTION OF THE DRAWINGS

The accompanying drawings are included to provide a further understanding of the invention and are incorporated in and constitute a part of this specification. The drawings illustrate embodiments of the invention and, together with the description, serve to explain the principles of the invention.

FIGS. 4A and 4B illustrate an operation of a portable electronic device according to another embodiment of the present invention.

FIGS. 6A-6C illustrate an operation of a portable electronic device according to another embodiment of the present invention.

FIGS. 7A-7C illustrate an operation of a portable electronic device according to another embodiment of the present invention.

DESCRIPTION OF EMBODIMENTS

Figure 1:
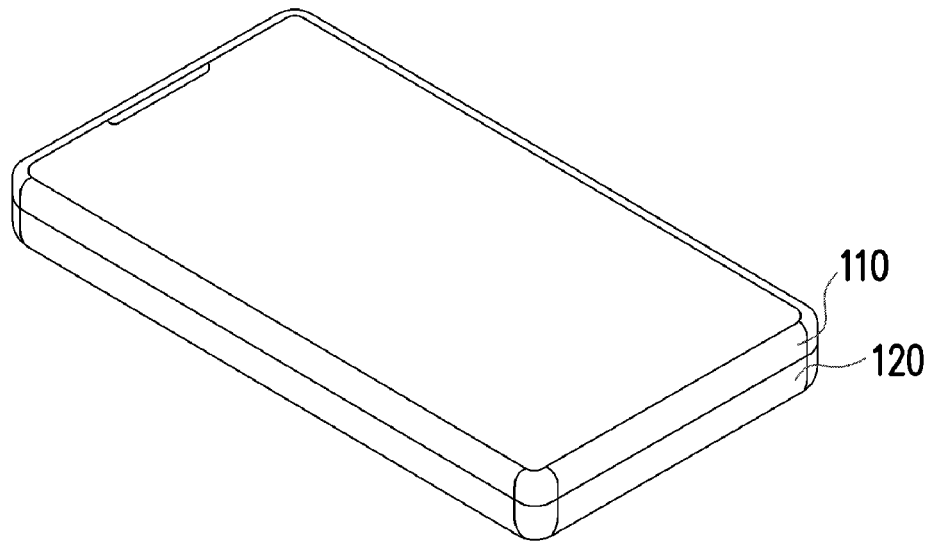
FIG. 1 is a schematic view of a portable electronic device according to an embodiment of the present invention.
Figure 2A:
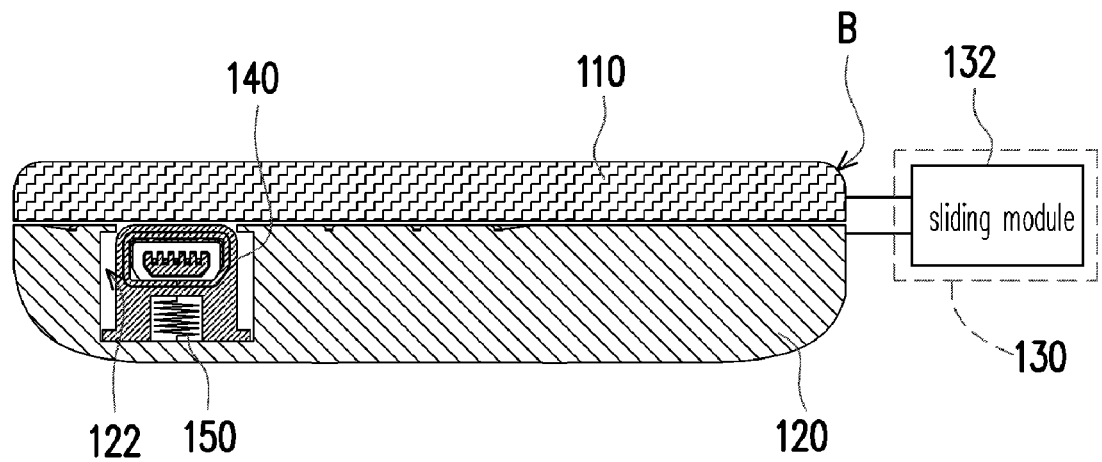
FIGS. 2A-2C illustrate an operation of the portable electronic device as depicted in FIG. 1.
Figure 2B:
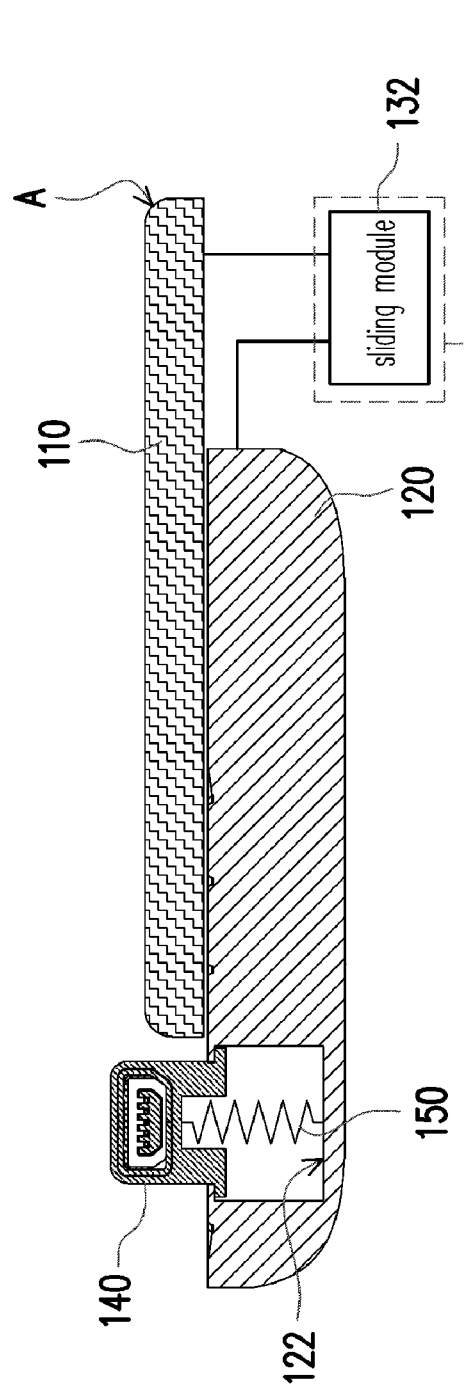
Figure 2C:
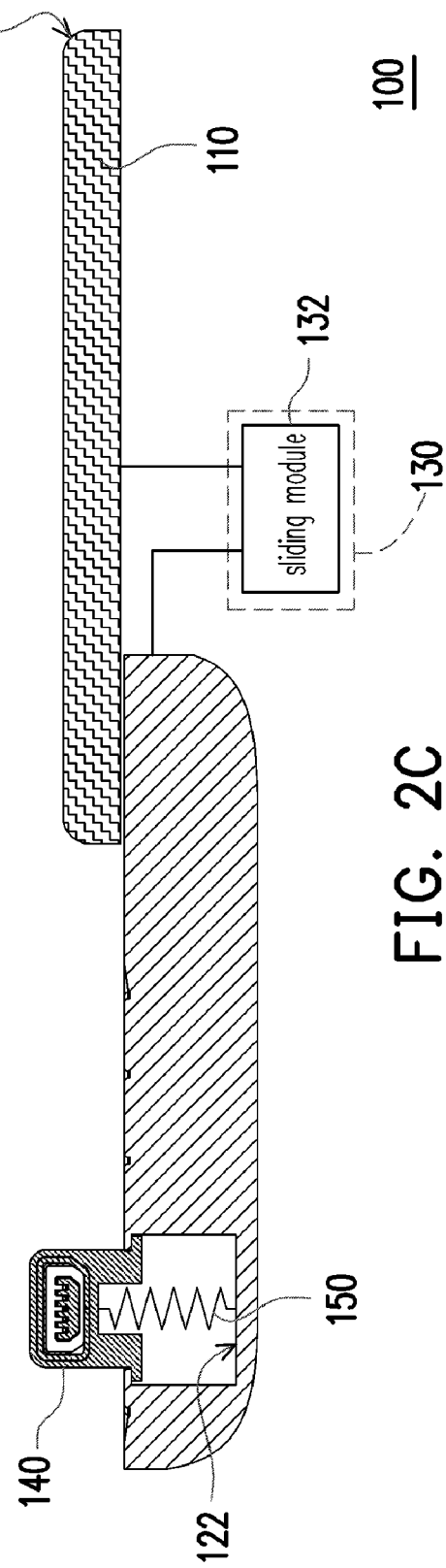

FIG. 1 is a schematic view of a portable electronic device according to an embodiment of the present invention. FIGS. 2A-2C illustrate an operation of the portable electronic device as depicted in FIG. 1. Referring to FIGS. 1, 2A, 2B, and 2C, the portable electronic device 100 includes a first body 110, a second body 120, a motion assembly 130, a connector 140, and an ejector 150. The second body 120 has a hollow portion 122, and the first body 110 is movable disposed on the second body 120 and covers the hollow portion 122. The motion assembly 130 is disposed between the first body 110 and the second body 120, such that the first body 110 is able to move relatively to the second body 120. The connector 140 is movably disposed in the hollow portion 122. The ejector 150 is disposed between the connector 140 and the second body 120.

As shown in FIGS. 2A-2C, according to the present embodiment, the motion assembly 130 includes a sliding module 132 which allows the first body 110 to slide relatively to the second body 120 between a second position B depicted in FIG. 2A and a third position C depicted in FIG. 2C. The ejector 150 includes an elastic element for driving the connector 140 to move out of the hollow portion 122.

Figure 3:
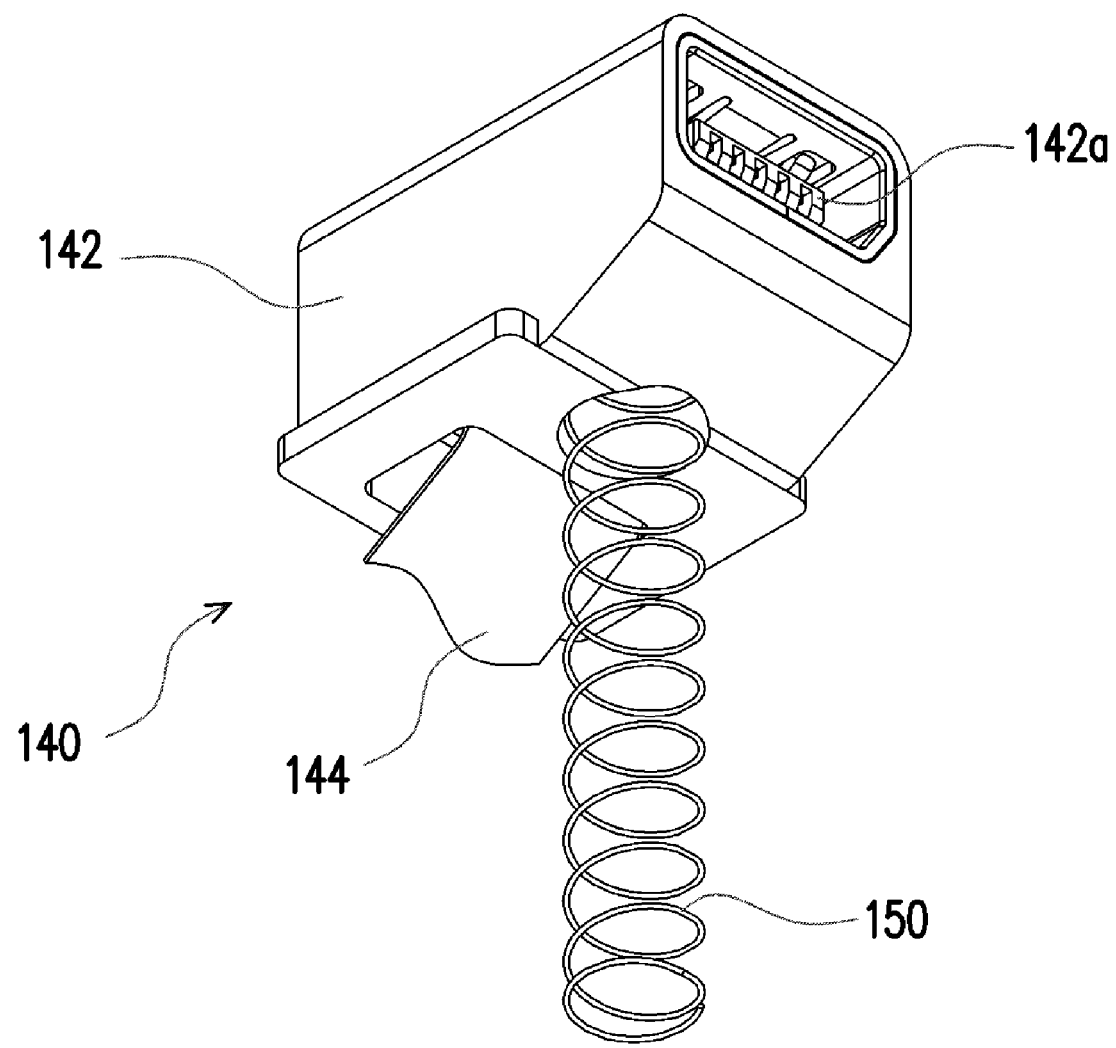
FIG. 3 is a schematic view of a connector in the portable electronic device depicted in FIGS. 2A-2C.

On the other hand, please refer to FIG. 3, which is a schematic view of a connector in the portable electronic device depicted in FIGS. 2A-2C. As shown in FIG. 3, the connector 140 includes a housing 142 and a connection line 144. The housing 142 has a plurality of terminals 142a, and the connection line 144 connects the terminals 142a and the second body 120. Additionally, the connection line 144 can be a flexible circuit board or a cable. In the present embodiment, a mini-USB connector acting as the connector 140 is exemplified, which should however not be construed as a limitation of the present invention. For instance, the connector 140 can also be a USB connector, a micro-USB connector, a 3.5 mm audio jack, and a memory card slot.

Referring to FIGS. 2A-2C, when the first body 110 slides relatively to the second body 120 to a first position A depicted in FIG. 2B, the hollow portion 122 of the second body 122 is exposed. At this time, the ejector 150 drives the connector 140 to spring out of the hollow portion 122.

In another embodiment not shown in the drawings of the application, the ejector 150 can also be a push-push type mechanism. When the hollow portion 122 is exposed to the outside of the second body 120, the connector 140 is not driven by the ejector 150 to automatically spring out as discussed in the above embodiment illustrated in FIGS. 2A-2C. Instead, when a user intends to use the connector 140, the user applies a force to the push-push type mechanism to release the connector 140 from the hollow portion 122. As such, the user is able to determine the timing of using the connector 140. In light of the foregoing, any member capable of driving the connector 140 to move out of the hollow portion 122 can serve as the aforesaid ejector 150.

On the other hand, in addition to the movement between the first body 110 and the second body 120 as illustrated in FIGS. 2A-2C, variations of relative positions between the first body and the second body are further described in the following embodiments. Besides, the connector correspondingly moving out of the hollow portion will also be discussed hereinafter.

FIGS. 4A and 4B illustrate an operation of a portable electronic device according to another embodiment of the present invention. In the present embodiment, the portable electronic device 200 includes a first body 210, a second body 220, a motion assembly 230, a connector 240, and an ejector 250. According to the present embodiment, the motion assembly 230 includes a sliding module 232, and the ejector 250 includes an elastic element. The sliding module 232 is disposed between the first body 210 and the second body 220, such that the first body 210 slides relatively to the second body 220 between a second position E depicted in FIG. 4A and a first position D depicted in FIG. 4B. When the first body 210 slides to the first position D, a hollow portion 222 of the second body 220 is exposed to the outside of the second body 220, and thereby the connector 240 can be sprung out of the hollow portion 222 by the ejector 250. Here, the position of the connector 240 on the second body 220 in this embodiment is different from the position of the connector 140 on the second body 120 in the previous embodiment.

FIGS. 5A-5D illustrate an operation of a portable electronic device according to another embodiment of the present invention. Referring to FIGS. 5A-5D, in the present embodiment, the portable electronic device 300 includes a first body 310, a second body 320, a motion assembly 330, a connector 340, and an ejector 350. According to the present embodiment, the motion assembly 330 includes a rotating module 334, and the ejector 350 includes an elastic element.

Figure 5A:
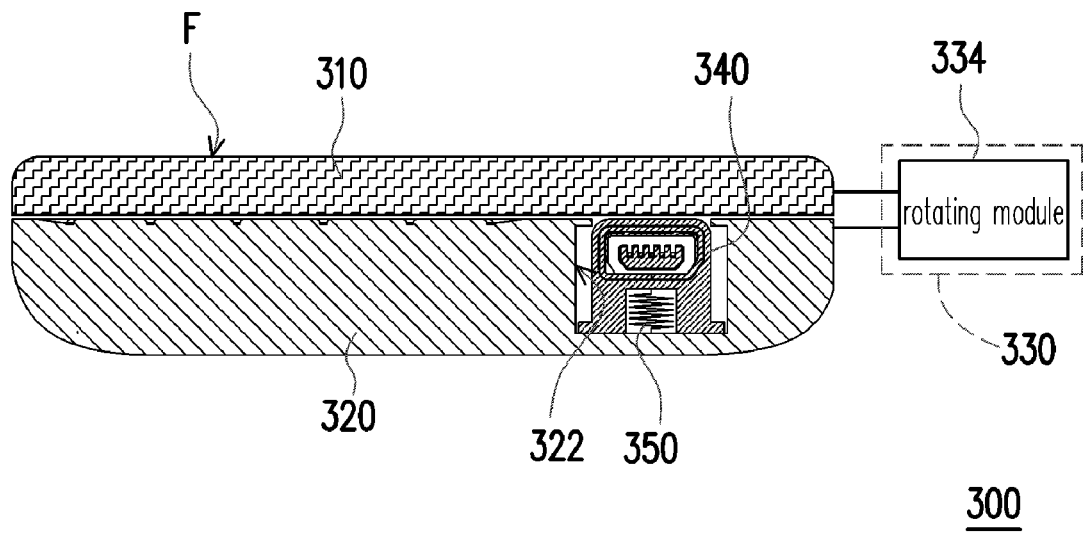
FIGS. 5A-5D illustrate an operation of a portable electronic device according to another embodiment of the present invention.
Figure 5B:
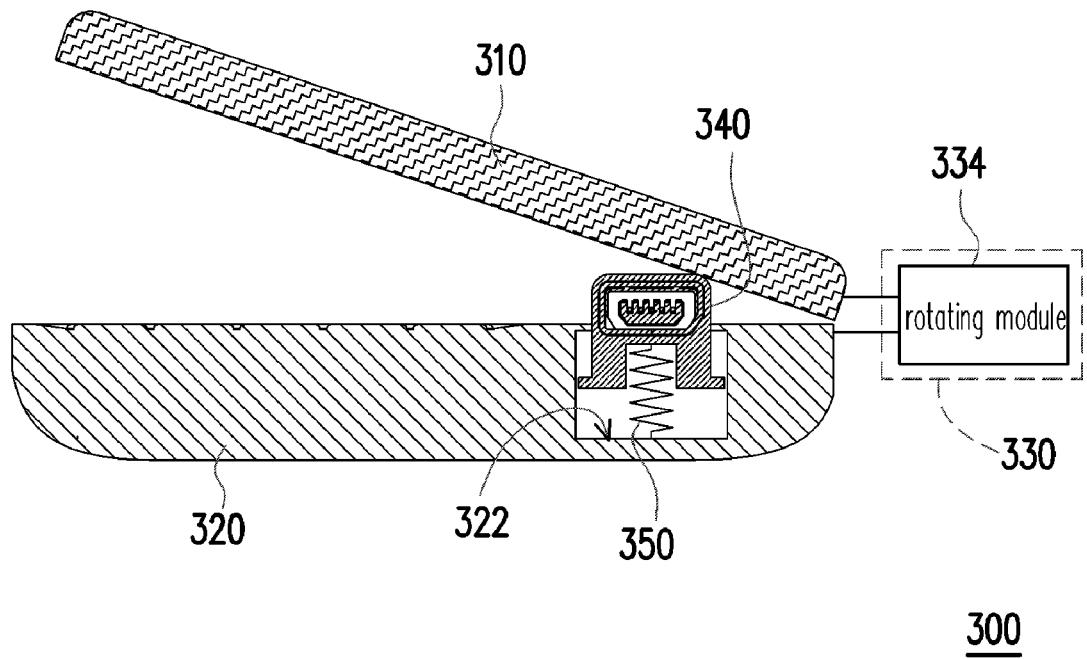
Figure 5C:
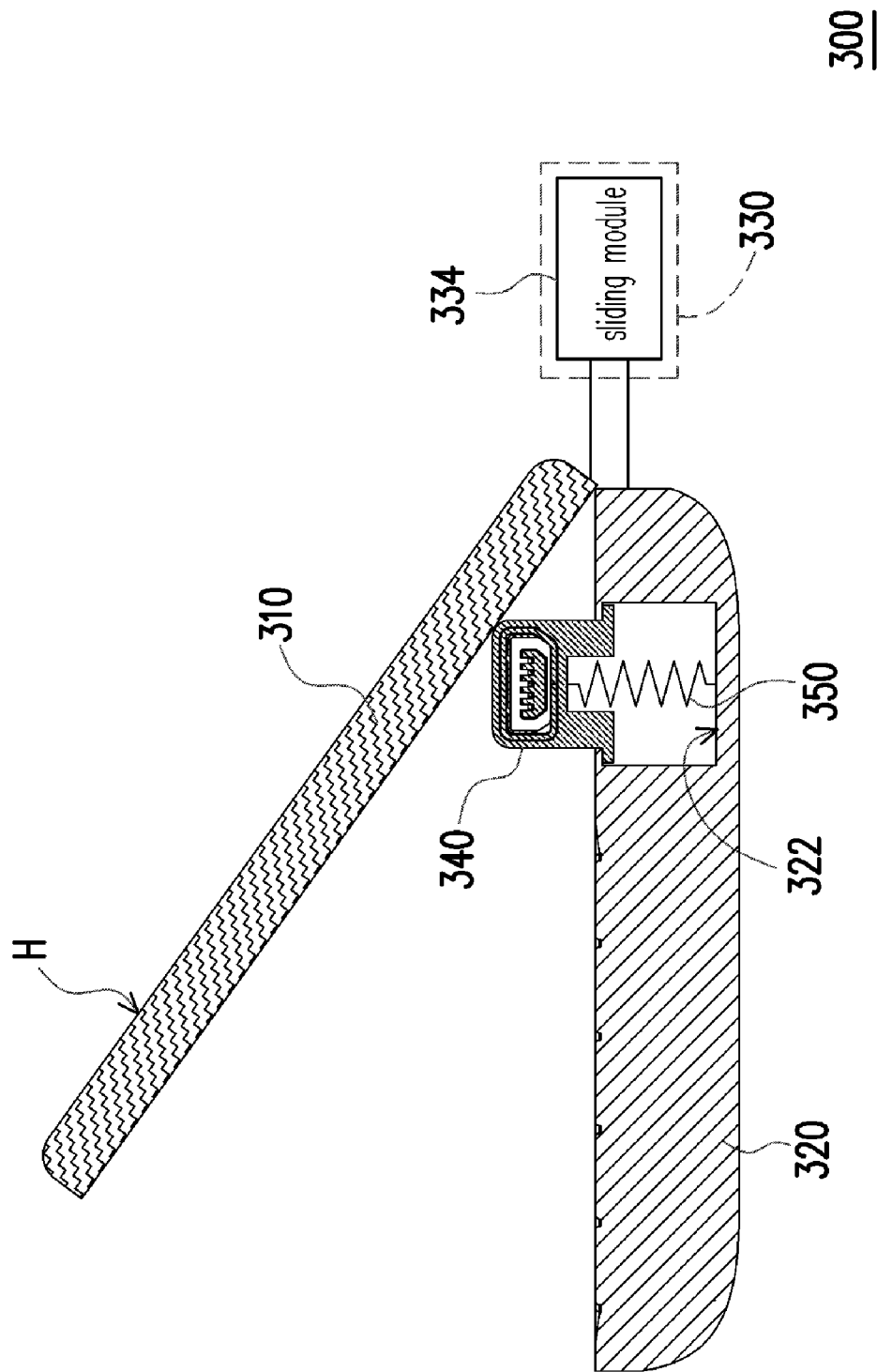
Figure 5D:
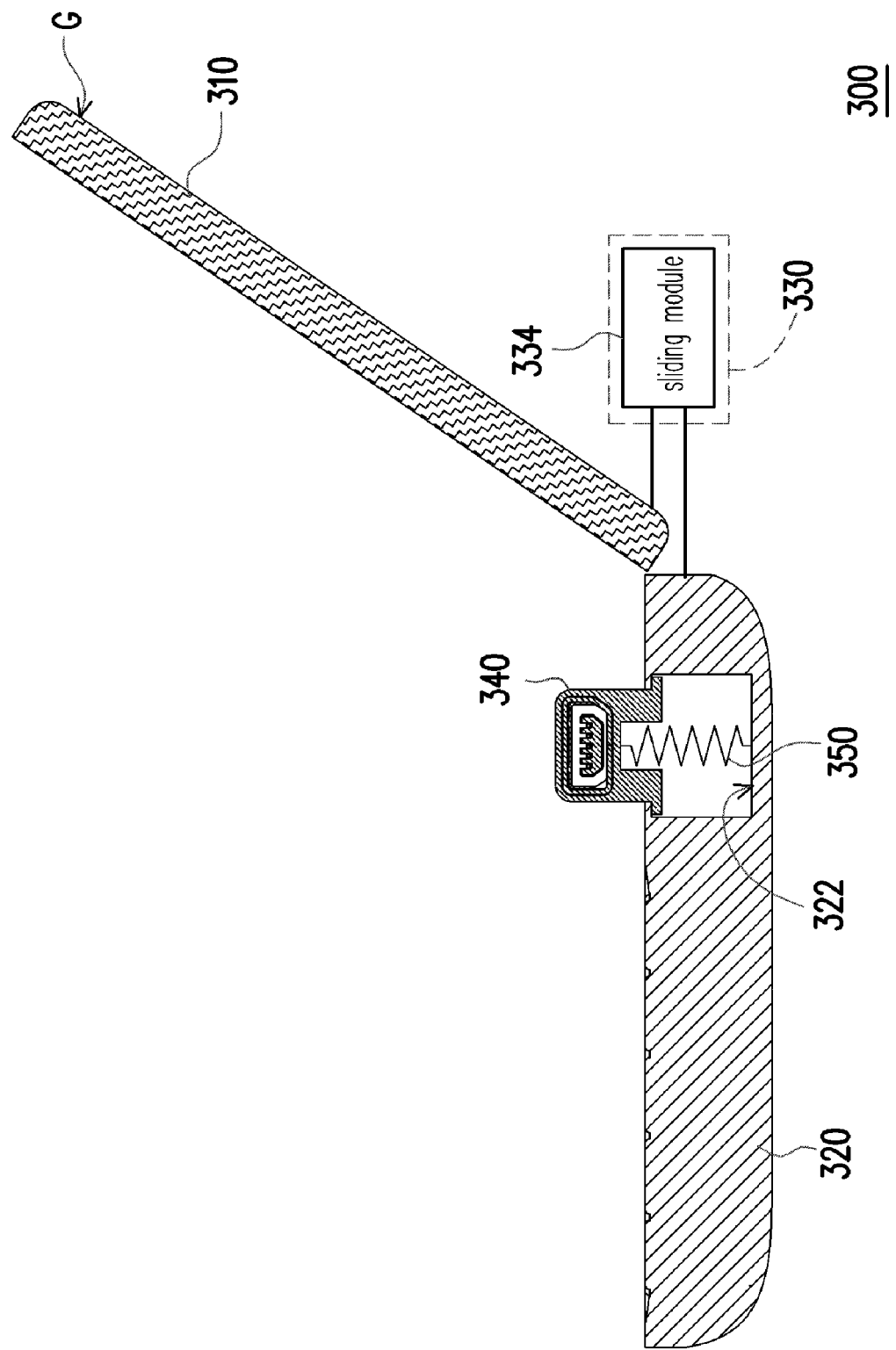

The rotating module 334 drives the first body 310 to rotate relatively to the second body 320 between a fourth position F depicted in FIG. 5A and a fifth position G depicted in FIG. 5D. When the first body 310 moves away from the fourth position F, the ejector 350 releases the connector 340 from a hollow portion 322. However, as indicated in FIG. 5B, the connector 340 is confined by the first body 310 and is not able to be completely moved out of the hollow portion 322. Until the first body 310 rotates to a first position H depicted in FIG. 5C, the connector 340 can then be completely moved out of the hollow portion 322.

Here, whether the connector 340 is completely sprung out of the hollow portion 322 is determined upon an angle between the first body 310 and the second body 320, which is not limited in the present invention. Designers can, based on design demands, make necessary modifications. In addition, according to another embodiment not shown in the drawings of the application, a push-push type mechanism (not shown) can act as the ejector 350. A user can apply a force to the push-push type mechanism so as to move out the connector 340 when the hollow portion 322 of the second body 320 is completely exposed to the outside of the second body 320.

Figure 6C:
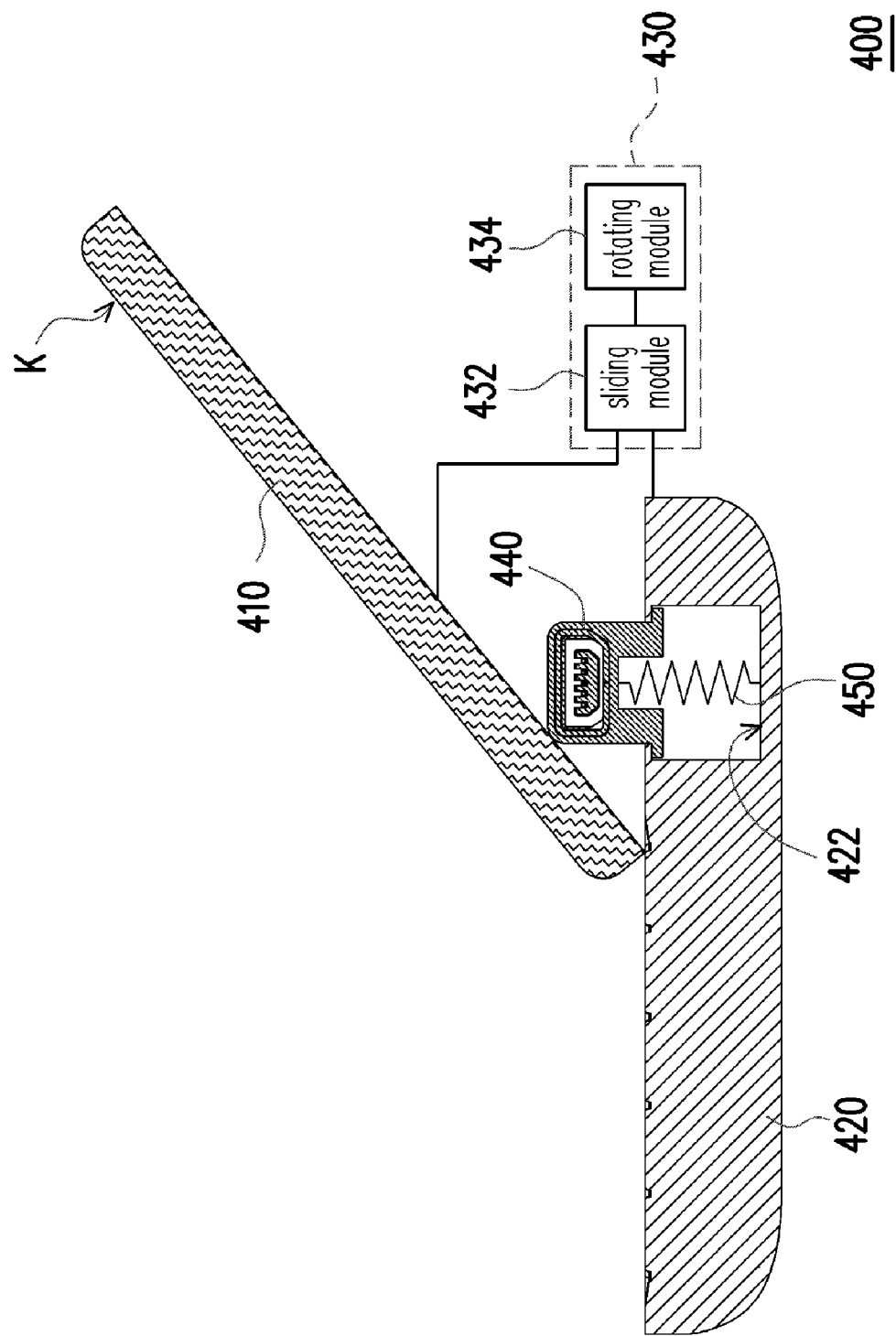

FIGS. 6A-6C illustrate an operation of a portable electronic device according to another embodiment of the present invention. Referring to FIGS. 6A-6C, the portable electronic device 400 includes a first body 410, a second body 420, a motion assembly 430, a connector 440, and an ejector 450.

The difference between the present embodiment and the previous embodiments lies in that the motion assembly 430 includes a sliding module 432 and a rotating module 434. The ejector 450 includes an elastic element. By means of the sliding module 434, the first body 410 slides between a sixth position I depicted in FIG. 6A and a seventh position J depicted in FIG. 6B. When the first body 410 slides to the seventh position J, the first body 410 rotates between the seventh position J and a first position K depicted in FIG. 6C by means of the rotating module 434. In the present embodiment, once the first body 410 rotates and moves away from the seventh position J, the ejector 450 drives the connector 440 to spring out of the hollow portion 422.

According to another embodiment not shown in the drawings of the present application, the push-push type mechanism can also serve as the ejector 450. When the first body 410 rotates to the first position, a force is applied to the push-push type mechanism so as to move the connector 440 out of the hollow portion 422.

FIGS. 7A-7C illustrate an operation of a portable electronic device according to another embodiment of the present invention. Referring to FIGS. 7A-7C, in the portable electronic device 500 of the present embodiment, a motion assembly 530 is different from the afore-mentioned motion assembly 430. Therefore, the rotation of the first body 410 relative to the second body 420 in the portable electronic device 500 is different from that in the portable electronic device 400 described in the previous embodiment. However, since the timing at which the connector 450 is moved out of the hollow portion 422 and the position of the connector 450 are the same as those discussed in the previous embodiment, no further description is provided herein.

In light of the foregoing, according to the above embodiments of the present invention, the portable electronic device has a hidden connector. Hence, when the connector is not in use, it can be hidden in the hollow portion without being exposed to the outside of the bodies. As a result, the portable electronic device of the present application has a simple look. By contrast, when the connector is to be used, the connector can be exposed to the outside of the bodies by way of relative movement between the bodies, and the connector can then be moved out of the hollow portion by the ejector.

Although the present invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:
1. A portable electronic device, comprising:
 a first body;
 a second body comprising a hollow portion, the first body being movable disposed on the second body to cover the hollow portion;
 a motion assembly disposed between the first body and the second body, such that the first body moves relatively to the second body;
 a connector movably disposed in the hollow portion; and
 an ejector disposed between the connector and the second body, wherein the ejector drives the connector to move out of the hollow portion when the first body moves relatively to the second body to expose the hollow portion of the second body.

2. The portable electronic device as claimed in claim 1, wherein the ejector comprises an elastic element driving the connector to move out of the hollow portion when the hollow portion of the second body is exposed.

3. The portable electronic device as claimed in claim 1, wherein the ejector is pushed by a force to move the connector out of the hollow portion after the hollow portion of the second body is exposed.

4. The portable electronic device as claimed in claim 1, wherein the connector comprises:
   a housing comprising a plurality of terminals; and
   a connection line connecting the terminals and the second body.

5. The portable electronic device as claimed in claim 1, wherein the hollow portion of the second body is exposed when the first body moves relatively to the second body to a first position.

6. The portable electronic device as claimed in claim 5, wherein the motion assembly comprises a sliding module by which the first body slides relatively to the second body between a second position and a third position, and the first position is located between the second position and the third position.

7. The portable electronic device as claimed in claim 5, wherein the motion assembly comprises a sliding module by which the first body slides relatively to the second body between the first position and a second position.

8. The portable electronic device as claimed in claim 5, wherein the motion assembly comprises a rotating module by which the first body rotates relatively to the second body between a fourth position and a fifth position, and the first position is located between the fourth position and the fifth position.

9. The portable electronic device as claimed in claim 8, wherein the motion assembly further comprises a sliding module by which the first body slides between a sixth position and the fourth position.

* * * * *